United States Patent [19]

Hayamizu et al.

[11] Patent Number: 4,721,058
[45] Date of Patent: Jan. 26, 1988

[54] PAPER CUTTING UNIT OF AUTOMATIC DRAWING MACHINES

[75] Inventors: Mamoru Hayamizu; Nobuo Tsukada, both of Tokyo, Japan

[73] Assignee: Seiko Instruments & Electronics Ltd., Tokyo, Japan

[21] Appl. No.: 706,482

[22] Filed: Feb. 28, 1985

[30] Foreign Application Priority Data

Mar. 2, 1984 [JP] Japan ................................. 59-40652

[51] Int. Cl.⁴ ............................................ B05C 11/00
[52] U.S. Cl. ..................................... 118/665; 83/271; 118/39; 118/697; 358/304
[58] Field of Search ................. 83/368, 371, 482, 349; 118/665, 39, 697; 346/24, 29; 358/304; 33/18.1

[56] References Cited

U.S. PATENT DOCUMENTS

| | | | |
|---|---|---|---|
| 2,792,889 | 5/1957 | Kusel | 83/482 |
| 3,583,269 | 6/1971 | Kobayashi et al. | 83/349 X |
| 4,506,824 | 3/1985 | Bartz | 83/371 X |

Primary Examiner—Evan K. Lawrence
Attorney, Agent, or Firm—Bruce L. Adams; Van C. Wilks

[57] ABSTRACT

An automated drawing system has an automatic drawing machine which receives input data from a central control unit for making a drawing on a roll of drawing paper in accordance with the input data. At the time of making the drawing, the automatic drawing machine also encodes the drawing paper with a bar code pattern representative of the lengthwise and widthwise size of the drawing. The drawing paper is then advanced to a paper cutter system which includes a bar code reader for reading and decoding the bar code pattern and for producing therefrom control signals indicative of the desired lengthwise and widthwise size of the drawing. These control signals are fed to a Y-axis or widthwise cutter and an X-axis or lengthwise cutter which accordingly cut the drawing paper in lengthwise and widthwise directions to obtain a cut piece of drawing paper containing thereon the drawing and having a size determined by the bar code pattern.

13 Claims, 14 Drawing Figures

PAPER CUTTING UNIT OF AUTOMATIC DRAWING MACHINES

BACKGROUND OF THE INVENTION

This invention relates to a drawing paper cutting system for automatic drawing machines using continuous roll type drawing paper.

In a conventional drawing paper cutting method for automatic drawing machines using continuous roll type drawing paper, the drawing paper is cut by actuating a cutter in accordance with a cutting instruction from a host computer. In this method, it is necessary to provide cables for transmitting instructions for actuating the cutter, and interfaces on the side of both the cutter and host computer. Accordingly, different interfaces are required for different types of host computers. The host computer and the automatic drawing machine and paper cutting unit are operated synchronously and consistently. Therefore, the drawing paper must be cut during a drawing operation, and cannot be cut afterward.

The cutting unit for this type of drawing machine using continuous roll type drawing paper consists solely of a Y-axis cutter means, which has rotary and fixed blades disposed in opposition to each other on both sides of the drawing paper and adapted to cut the drawing paper continuously in the Y-axis direction which is at substantially right angles to the direction in which the drawing paper is fed, by bringing an edge of the fixed blade into contact with that of the rotary blade. The roll paper is thus cut at regular intervals only in the paper-feeding direction. It is needless to say that this cutting unit is incapable of cutting the drawing paper in the X-axis direction which is parallel to the paper-feeding direction. therefore, in this cutting unit, the drawing paper is cut to only a predetermined size. Hence, even when an intermediate-sized or large-sized automatic drawing machine having a cutting unit for, for example, A1-sized drawing paper is used with a view to outputting an A4-sized drawing therefrom, the drawing paper is cut to the A1-size, so that the area of the effective region of the cut drawing paper is ⅛ of the total area thereof with the remaining ⅞ of the total area thereof occupied by a blank region. Consequently, if the drawing paper is used in this manner, much more than the required quantity of drawing paper is consumed, i.e., a large amount of drawing paper is wasted. To store such an outputted drawing according to its size for the purpose of using the drawing as an original, it is necessary that the blank portion thereof be cut off so as to set the size of the drawing to a desired size. This causes a great decrease in the operating efficiency of a high-output drawing machine.

SUMMARY OF THE INVENTION

The present invention has been developed in view of the aforementioned problems in a conventional drawing paper cutting system for automatic drawing machines using continuous roll type drawing paper. To make a drawing on roll type drawing paper by a host computer-controlled automatic drawing machine in the paper cutting system according to the present invention, discriminating signals, for example, bar codes are written on the drawing paper simultaneously with a drawing, and this roll type drawing paper which carries both drawing and discriminating signals thereon is fed to a paper cutting unit. The paper cutting unit receives the drawing- and signal-carrying drawing paper and is provided with a cutter means, composed of a Y-axis cutter having rotary and fixed blades disposed in opposition to each other on both sides of the drawing paper and adapted to cut the drawing paper continuously in the Y-axis direction which is at substantially right angles to the direction in which the drawing paper is fed, by bringing an edge of the fixed blade into contact with that of the rotary blade, and a rotary disc X-axis cutter having a circumferentially grooved rotary body disposed on one side of the drawing paper. A slitter knife disposed in opposition to the rotary body and on the other side of the drawing paper is moved selectively at substantially right angles to the drawing paper into and out of the circumferential groove in the rotary body to thereby cut the drawing paper in the X-axis direction parallel to the drawing paper-feeding direction, and a control means for controls the cutter means in accordance with a signal from a detecting means which is adapted to read the discriminating signal written on the drawing paper.

Owing to the above construction, the discriminating signals designated by the automatic drawing machine are detected by the detecting means in the cutting unit, and the Y-axis cutter and X-axis cutter in the cutter means. this enables drawing paper of a desired size to be output independently of, and even after, the drawing-making operation by the automatic drawing machine without cutting the drawing paper simultaneously with the mentioned drawing-making operation. Therefore, this paper cutting system is used suitably for outputting a large quantity of drawings from the drawing machine. Moreover, even when a different type of automatic drawing machine and a different type of host computer are provided, this paper cutting system can be used practically provided that predetermined discriminating signals are written on the drawing paper.

It is; therefore, an object of the present invention to provide a paper cutting system of wide use for automatic drawing machines.

DETAILED DESCRIPTION OF THE INVENTION

An embodiment of the paper cutting system for automatic drawing machines according to the present invention will now be described in detail with reference to the accompanying drawings.

Figure 1:
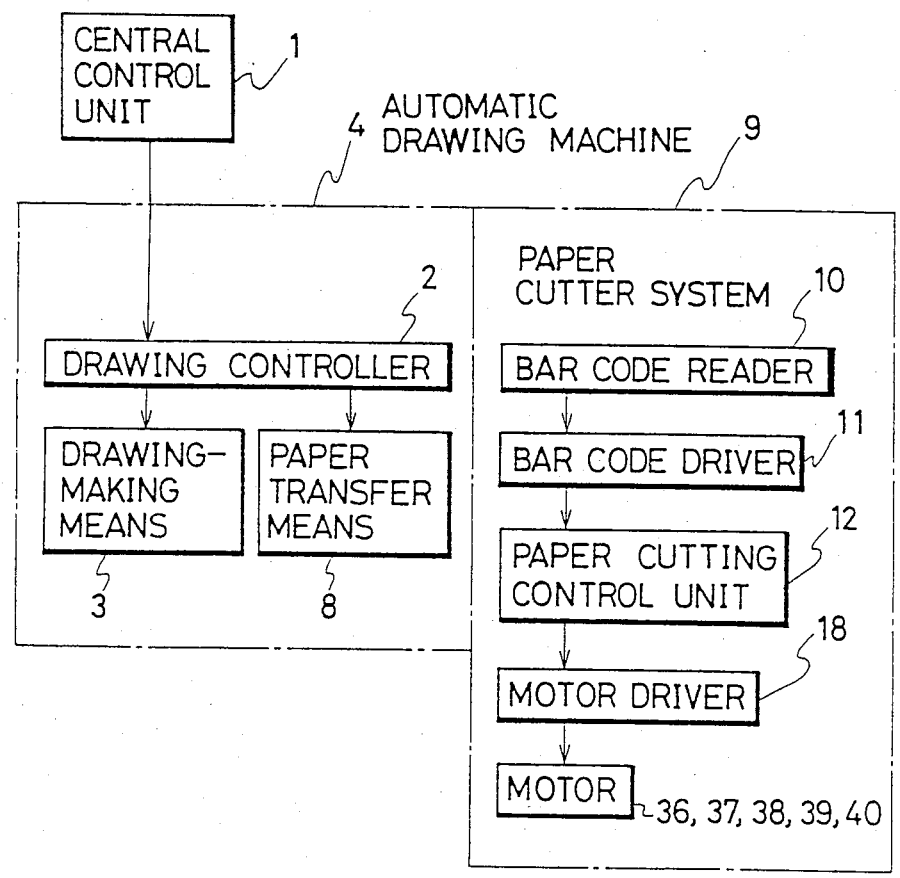
FIG. 1 is a system block diagram of a paper cutting system for automatic drawing machines according to the present invention.
Figure 2:
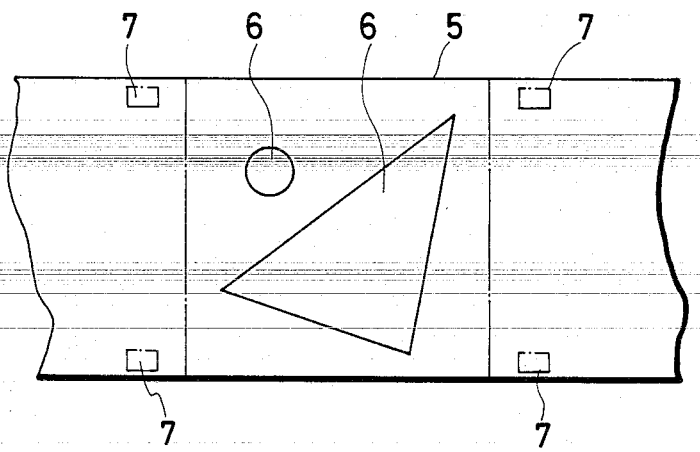
FIG. 2 illustrates the drawing paper on which drawings and discriminating signals have been set down by an automatic drawing machine in the system shown in FIG. 1.

FIG. 1 is a system diagram of the paper cutting system for automatic drawing machines according to the present invention. In a general operation of this system, an output from a central control unit 1 corresponding to a host computer, into which the data including the information on the desired drawing and paper sizes are inputted in advance, is inputted into a drawing controller 2 in an automatic drawing machine 4, which has a drawing-making means 3 in addition to the drawing controller 2. The drawing-making means 3 is controlled by the drawing controller 2, and drawings 6 and coded data in the form of discriminating signals 7, which are designated by the central control unit 1, are written on a section of roll type drawing paper 5 as shown in FIG. 2. The paper 5 on which the drawings 6 and discriminating signals 7 are written is transferred to a paper cutter means 9 by a paper transfer means 8.

The discriminating signals 7 on the paper 5 are read by a bar code reader 10 in the paper cutter means 9. When these signals 7 are input into a paper cutting control unit 12 through a bar code driver 11, a motor driver 18 is controlled thereby, to carry out a rotational movement of a rotary blade 69 of a Y-axis cutter which s adapted to cut the paper 5, which is sent from the automatic drawing machine 4 to the paper cutter means 9 by the paper transfer means 8, continuously in the Y-axis direction which is at substantially right angles to the paper feeding direction, to carry out a rotational movement of a circumferentially-grooved rotary body (drag roller) 81 which is adapted to cut the paper 5 continuously in the X-axis direction which is parallel to the paper feeding direction, to carry a vertical movement of a rotary slitter knife 90, and to carry out a movement of a shutter plate 95 which is adapted to control a transfer system for the paper 5 cut off by the Y-axis cutter.

Figure 3:
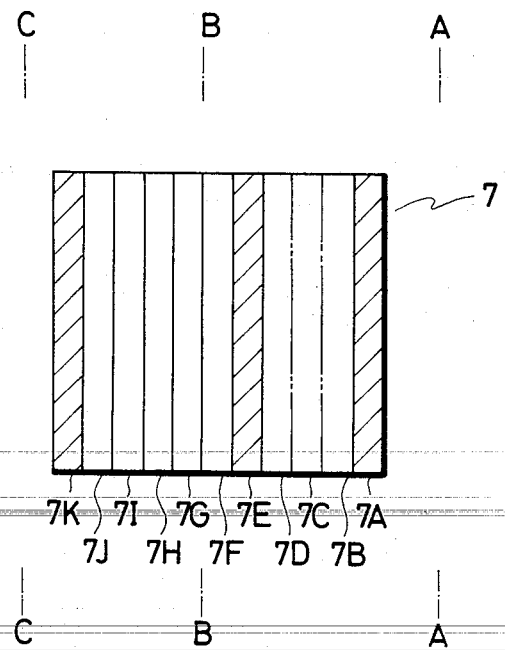
FIG. 3 illustrates a discriminating signal written on the paper shown in FIG. 2.

The discriminating signals or coded data 7 drawn or encoded on the drawing paper 5 by the drawing-making means 3 in the automatic drawing machine 4 and are positioned on opposite sides of a drawing-carrying region thereof as shown in FIG. 2, and each of the discriminating signals 7 is formed as coded data in the form of a bar code pattern as shown in FIG. 3. One bar code region constituting each discriminating signal 7 is divided into eleven sections 7A–7K. For example, if predetermined sections of this bar code region are black, such designates information on various cutting methods and positions to be written on the drawing paper. For example, the information for cutting the paper 5, which has a discriminating signal 7 consisting of a bar code including black sections, along the line A—A in a fore position of the signal 7 (in this case, the whole of the bar code remains on the paper 5), the information for cutting the same paper 5 along the line B—B in an intermediate position of the signal 7 (in this case, half of the bar code remains on the paper 5), the information for cutting the same paper 5 along the line C—C in an after-position of the signal 7 (in this case, no bar code remains on the paper 5), and the information for cutting the same paper 5 along the X-axis are written on the paper 5. While the paper 5 is fed to the paper cutter means 9, the bar codes constituting the discriminating signals 7 formed on the paper 5, are detected by discriminating signal detectors 20 (shown in FIGS. 4 and 5) each of which consists of a bar code reader 10 and a pulse encoder 19, and signals are inputted into the paper cutting control unit 12 through the bar code driver 11. These signals are used to select a paper cutting mode.

The paper cutter means 9 applied to the paper cutting system according to the present invention shown in FIG. 1 is disposed above the automatic drawing machine 4 as shown in detail in FIGS. 4–11. The paper 5, on which drawings and discriminating signals 7 are set down by the drawing-making means 3 in the automatic drawing machine 4, is guided to a paper discharge port 24 of the automatic drawing machine 5 by the paper transfer means 8, which consists of paper feed rollers 21, 22, 23 disposed in the drawing machine 4. The paper 5 is then guided by a guide plate 25, an end portion of which is inserted into the discharge port 24, of the paper cutter means 9, and passes the lower surfaces of the bar code readers 10 in the detectors 20 to be then fed to the paper cutting unit 12. Reference numeral 28 denotes a cover for the detector 20.

Figure 4:
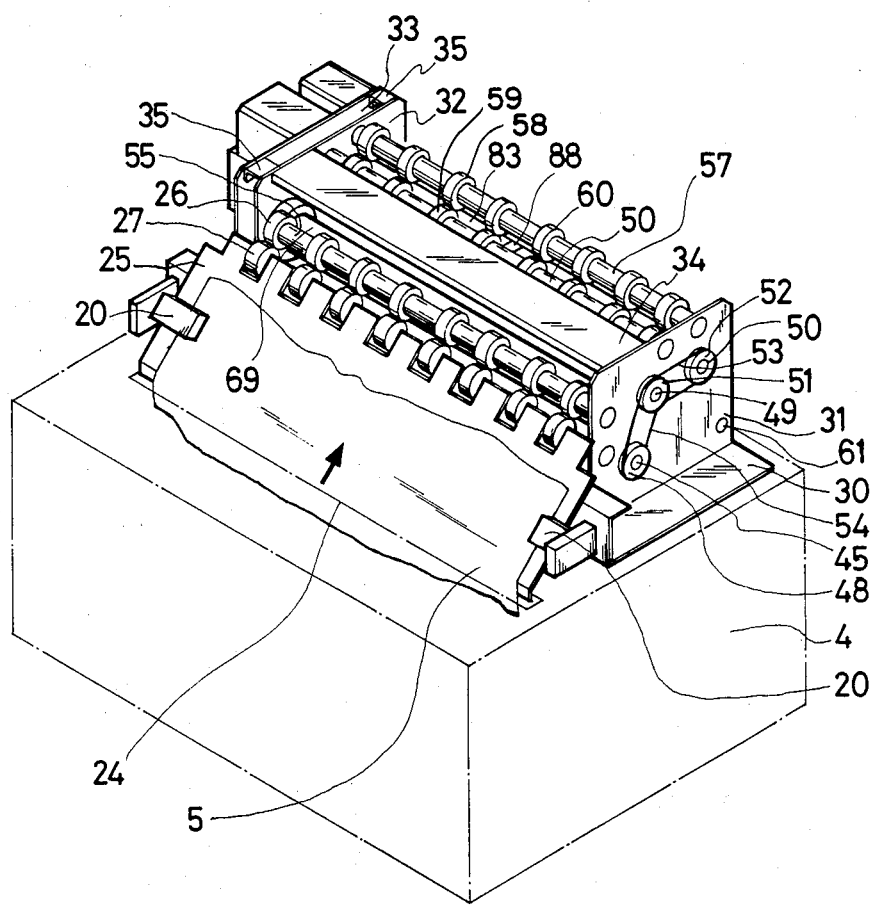
FIG. 4 is a perspective view showing the arrangement relation between the automatic drawing machine and paper cutting unit in the above system.
Figure 5:
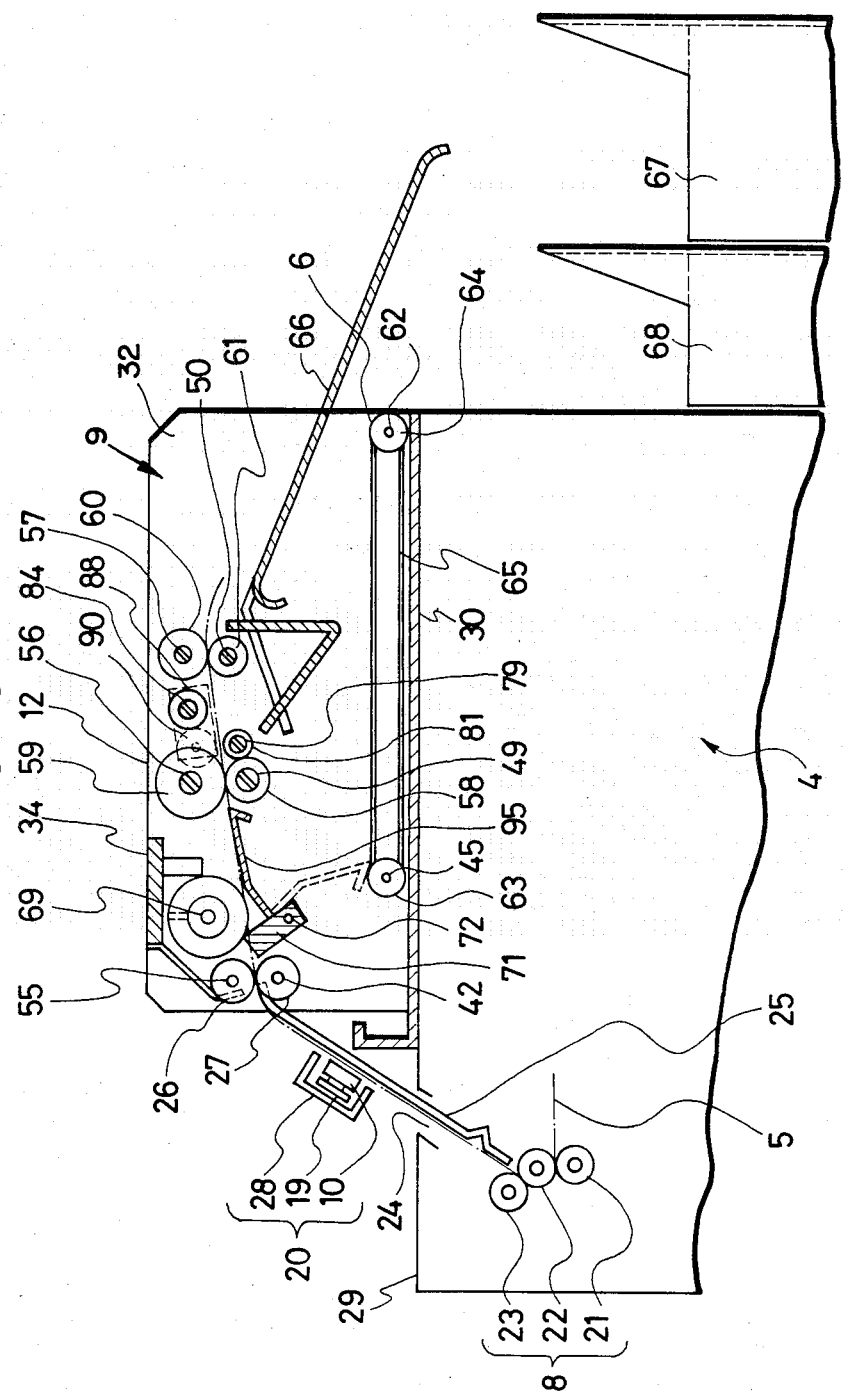
FIG. 5 illustrates the inner construction of part of the arrangement shown in FIG. 4.
Figure 6:
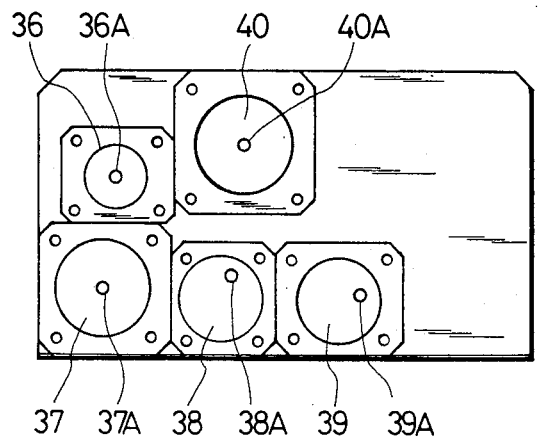
FIG. 6 illustrates parts arranged on a third side plate in the paper cutting unit usable for the system shown in FIGS. 4 and 5.

The paper cutter means 9, which is adapted to cut the roll type paper 5 on which the drawings and discriminating signals (coded data) are set down in the automatic drawing machine 4, is capable of cutting the paper 5 on the basis of the instructions, which are in accordance with the control signals output from the detectors 20 and representing the discriminating signals 7 on the paper 5, from the paper cutting control means 12 initially in the Y-axis direction which is at substantially right angles to the paper feeding direction and thereafter in the X-axis direction which is parallel to the paper feeding direction. As shown in FIG. 4, the main frame of the paper cutter means 9 consists of a bottom plate 30 fixed to an upper plate 29 of the automatic drawing machine 4, a first side plate 31 fixed to the bottom plate 30 so as to extend upward and constituting one side wall, a second side plate 32 also fixed to the bottom late 30 so as to extend upward and constituting the other side wall, a third side plate 33 spaced from the second side plate 32, a bridge plate 34 connecting the first and second side plates 31, 32 together firmly, and a fixing member 35 connecting the second and third side plates 32, 33 together firmly. The third side plate 33 is provided thereon, as shown in FIG. 6, with a geared motor 36 for moving an X-axis cutter in the vertical direction, an X-axis cutter-driving motor 37, a geared motor 38 for moving a shutter plate in the vertical direction, a geared motor 39 for transferring the drawing paper, and a Y-axis cutter-driving motor 40, all of these motors being attached to the plate 33.

The motor 39 is used as a driving power source for a transfer mechanism which is designed to transfer the drawing paper 5, which has been fed to the interior of the paper cutter means 9, to various parts of the apparatus. A signal for instructing the driving of the motor 39 is obtained by the paper cutting control means 12, and a pulley 41 is mounted fixedly on an output shaft 39 of the motor 39. An output from the motor 39 is transmitted to a rotary shaft 42, which is supported rotatably via bearings between the first and second side plates 31, 32, through a belt 44 which is wrapped around a pulley 43, which is mounted fixedly on an end portion extending between the second and third side plates 32, 33 of the shaft 42, and the pulley 41, and also transmitted to a rotary shaft 45, which is supported rotatably via bearings between the first and second side plates 31, 32, through a belt 47 which is wrapped around a pulley 46, which is mounted fixedly on an end portion extending between the second and third side plates 32, 33 of the shaft 45, and the pulley 41. The output from the motor 39, which has been transmitted to the rotary shaft 45, is further transmitted to a pulley 48 which is mounted fixedly on the other end portion extending to the outside of the first side plate 31 of the shaft 45, and transmitted to rotary shafts 49, 50, which are supported rotatably via bearings between the first and second side plates 31, 32, through belts 53, 54 which are wrapped around pulleys 51, 52 mounted fixedly on end portions extending to the outside of the first side plate 31 of the shafts 49, 50 and around the pulleys 51, 48. The system for thus transmitting the power from the motor 39 to the rotary shafts 42, 45, 49, 50 constitutes a driving system for the paper transfer mechanism.

This paper transfer mechanism will now be further described. In the paper transfer mechanism, the rotary shaft 42 and a rotary shaft 55 supported rotatably via bearings between the first and second side plates 31, 32 so as to extend in parallel with the shaft 42; the rotary shaft 49 and a rotary shaft 56 supported rotatably via bearings between the first and second side plates 31, 32 so as to extend in parallel with the shaft 49; the rotary shaft 50 and a rotary shaft 57 supported rotatably via bearings between the first and second side plates 31, 32 so as to extend in parallel with the shaft 50; and the rotary shaft 45 and a rotary shaft 64 supported rotatably via bearings between the first and second side plates 31, 32 are provided in paired states. These pairs of rotary shafts 42, 55; 49, 56; 50, 57 are provided thereon with press-contacting feed rollers 27, 26; 58, 59; 61, 60. The feed rollers 58, 59 mounted on the rotary shafts 49, 56 are arranged so that two pairs of feed rollers 58, 59 are positioned on the left-hand portions of the shafts 49, 56 with another two pairs of feed rollers 58, 59 positioned on the right-hand portions thereof for the purpose of forming a hollow space around the central portions of the shafts 49, 56 so as not to prevent operation of an X-axis cutter 78 which will be described later. The other rotary shafts 42, 55; 50, 57 are provided thereon with eight each feed rollers 27, 26; 59, 58 so that the rollers are spaced at substantially regular intervals (FIG. 4). The paper 5 fed between the feed rollers 26, 27; 58, 59; 60, 61 is transferred frictionally by the rotation of the driving feed rollers 27, 58, 61. The outer peripheral speed of the driving rollers 27, 58, 61 is set somewhat higher than the speed at which the paper 5 is transferred by the paper transfer means 8 in the automatic drawings machine 4. Since the paper 5 is fed as it slips on the feed rollers 27, a suitable level of tensile force is applied to the portion of the paper 5 which is between the paper transfer means 8 and the feed rollers 26, 27, so that the discriminating signals 7 written thereon can be detected reliably by the detectors 20. The feed rollers 26, 27, 58, 59, 60, 61 consist of resin rollers except the feed rollers 26, which consist of iron rollers.

In this paper transfer mechanism, the rotary shafts 45, 62 are provided thereon with a plurality of pulleys 63, 64, which are arranged fixedly in the axial direction of the mentioned shafts. Between these pulleys 63, 64 are provided a plurality of endless conveyor belts 65. The paper 5 is usually transferred from the position between the feed rollers 26, 27 to the positions between the feed rollers 58, 59; 60, 61, and then inserted into a drawing storage box 67 as the paper 5 is guided by a transfer guide plate 66 provided at the back of the paper cutter means 9. When the chips of the paper 5 drop onto the conveyor belt 65 with a shutter plate 95, which will be described later, in a downwardly-pivoted position, they are carried to a position behind the paper cutter means 9 by the conveyor belt 65, which is rotated between the pulleys 63, 64, to be inserted into a chip box 68.

Figure 8:
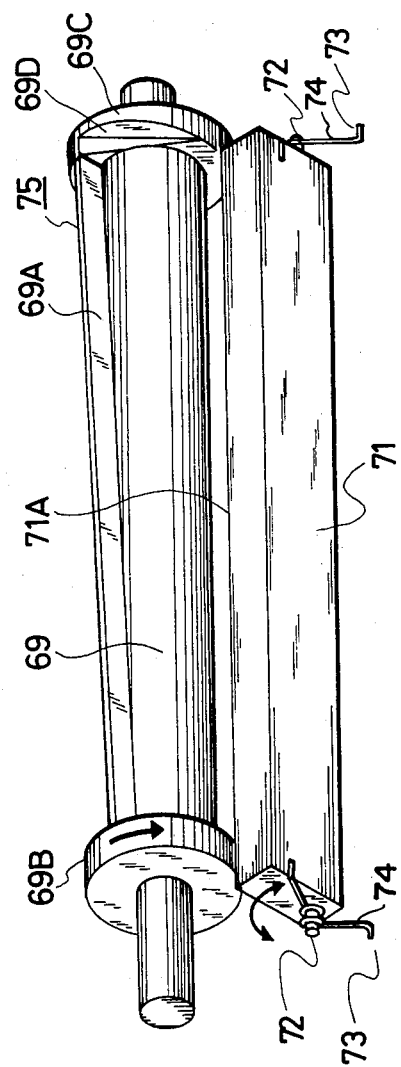
FIG. 8 is a perspective view showing the construction of a Y-axis cutter in the paper cutting unit.

The motor 40 is used as a driving power source for a Y-axis or widthwise cutter 75 which is operable to cut the paper 5 continuously in the Y-axis or widthwise direction which is at substantially right angles to the paper feeding direction. The instruction signals for driving the motor 40 are obtained from the paper cutting control unit 12. An output from the motor 40 is transmitted to a rotary cutter member 69, which is supported rotatably via bearings between the first and second side plates 31, 32, via gears (not shown) so as to turn the cutter member 69. As shown in FIG. 8, the rotary cutter member 69 is provided on its outer circumferential surface with a spiral blade 69A extending contrary or opposite to the rotational direction of the cutter member 69, a disc portion 69B formed at one side portion of the spiral blade 69A, a disc portion 69C formed at the other side portion of the spiral blade 69A and having an outer diameter slightly larger than that of the disc portion 69B, and a notch portion 69D formed on the inner surface of the disc portion 69C so as to reduce the thickness of the disc portion 69C gradually in the direction contrary or opposite to the rotational direction of the cutter member 69. A timing cam 70 is provided on one end surface of the rotary cutter member 69 to which the motor 40 is gear-connected through the second side plate 32. The rotary cutter member 69 is stopped with the spiral blade 69A in an upper position every time the cutter member 69 makes one turn, by an operation of a microswitch (not shown) which contacts the cam 70.

In a position which is in opposition to the rotary cutter member 69 with the path of the paper 5 extending therebetween, a fixed blade 71 is provided, and a pivot 72 extending outward from both ends of the fixed blade 71 is supported rotatably via bearings on the first and second side plates 31, 32. The pivot 72 is provided thereon with springs 74, each of which is engaged at its one end portion 73 with a bore made in the side plate 31 or 32, and at the other end portion with the fixed blade 71, so as to urge an edge portion of the fixed blade 71 constantly and in the pivotal direction toward the rotary cutter member 69. The fixed blade 71 and rotary cutter member 69 constitute a Y-axis cutter 75 for cutting the paper 5, which has been fed thereto, continuously in the Y-axis direction which is at substantially right angles to the paper feeding direction.

Figure 9A:
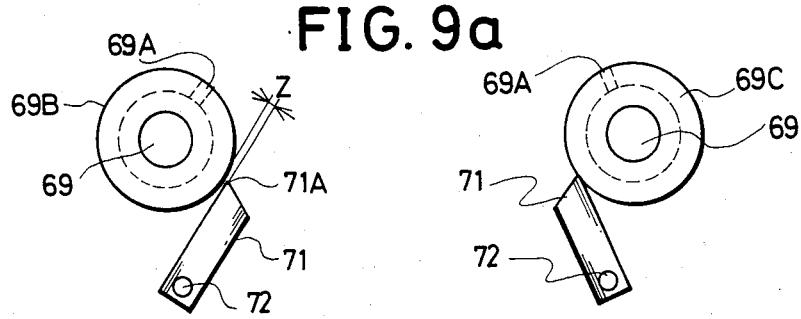
FIGS. 9a-9d are explanatory views showing the operation of the Y-axis cutter.

When the Y-axis cutter 75 is not in operation for cutting the paper 5, it is in the state shown in FIG. 9a. Namely, the fixed blade 71 contacts the rotary cutter member 69 in such a manner that the portion of the fixed blade 71 which is on the side of the disc portion 69C (righthand side in FIGS. 8 and 9) engages with the outer circumferential surface of the disc portion 69C whereas the portion of the fixed blade 71 which is on the side of the disc portion 69B (lefthand side) not engaged with the disc portion 69B; a gap Z is formed between the disc portion 69B and the fixed blade 71. During this time, the spiral blade 69A of the rotary cutter member 69 is in an upper position, and, therefore, a passage sufficiently wide to permit the paper 5 to pass therethrough is formed between the rotary cutter member 69 and the fixed blade 71. When a paper-cutting operation is not carried out, the paper 5 is transferred to the rear side through this passage.

Figure 9B:
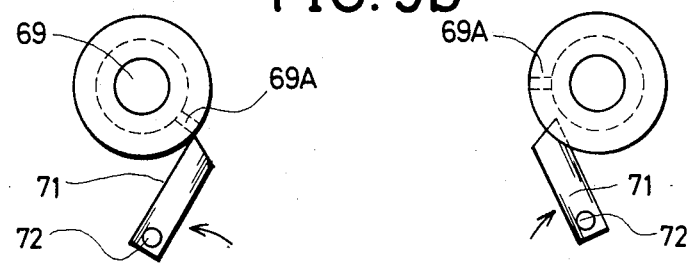
Figure 9C:
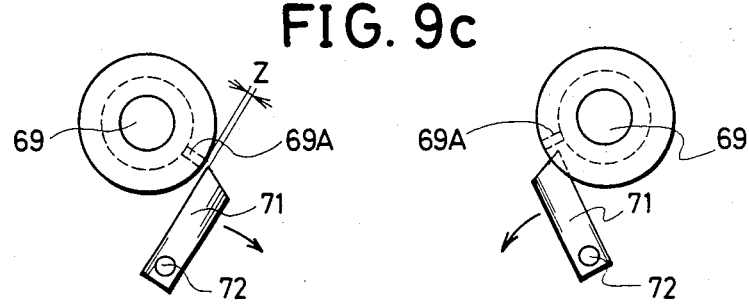
Figure 9D:
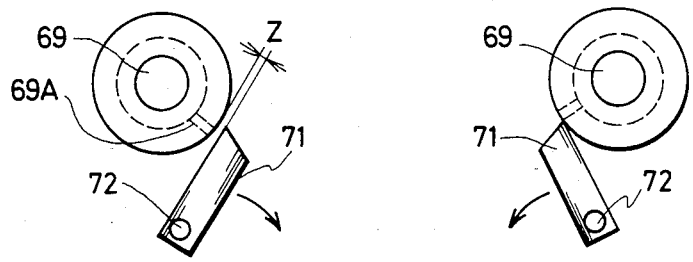

When the motor 40 is then driven to cause the cutter member 69 to start rotating, and the notch portion 69D formed on the disc portion 69C is displaced to a position opposed to the fixed blade 71 which is urged against the disc portion 69C of the rotary cutter member 69, the fixed blade 71 is turned gradually to the central portion of the rotary cutter member 69 as it is guided by an inclined inner surface of the notch portion 69D. Consequently, the fixed blade 71 engages the disc portion 69B of the rotary cutter member 69 as shown in FIG. 9b, and the spiral blade 69A of the rotary cutter member 69 comes into point-contact from the lefthand side of FIG. 8 with the edge 71A of the fixed blade 71, so that a paper-cutting operation is started. When the cutter member 69 is further turned, the fixed blade 71 is also turned gradually toward the central portion of the rotary cutter member 69 as it is guided by the inclined inner surface of the notch portion 69D. As the fixed blade 71 is thus turned, the position in which the edge of the spiral blade 69A of the rotary cutter member 69 and the edge 71A of the fixed blade 71 make point-contact with each other is displaced continuously toward the central portion of the cutter member 69. Thus, the cutting of the paper 5, which is positioned between the rotary cutter member 69 and fixed blade 71, in the Y-axis direction.

Figure 7:
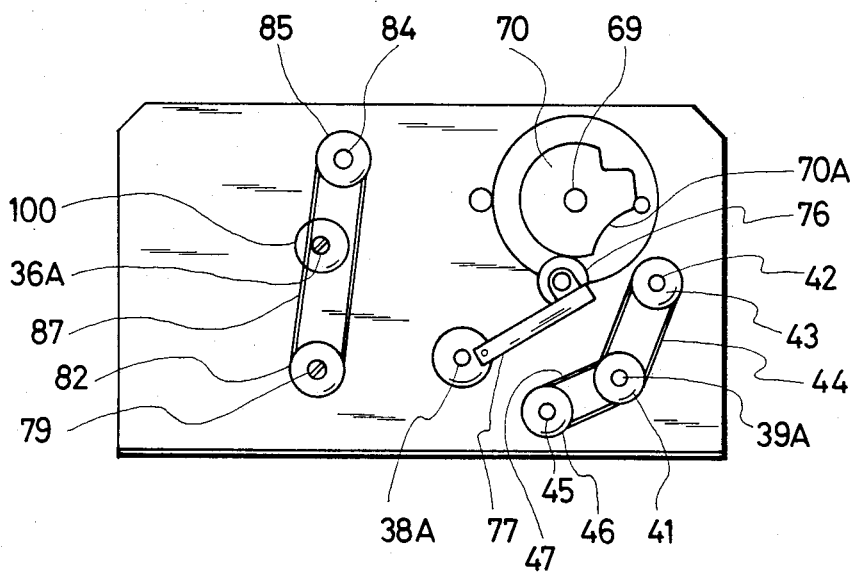
FIG. 7 illustrates parts arranged on a second side plate in the same paper cutting unit.

When the cutting of the paper 5 in the Y-axis direction has proceeded to the substantially central portion of the rotary cutter member 69, the fixed blade 71 starts being turned in the contrary direction, i.e., away from the central portion of the rotary cutter member 69 (see FIG. 9c) with the edge of the blade 69A of the rotary cutter member 69 and the edge 71A of the fixed blade 71 kept in point-contact with each other, via a link bar 77 having at its one end a roller 76 engaged with and guided by a cam surface 70A of the timing control cam 70 (FIG. 7). When the fixed blade 71 reaches a predetermined position on the outer circumferential surface of the disc portion 69C of the rotary cutter member 69, the cutting of the paper 5 in the Y-axis direction is completed (see FIG. 9d). When the rotary cutter member 69 is further turned with the fixed blade 71 in engagement with the circumferential surface of the disc portion 69C, to again reach the position, shown in FIG. 9a, the supplying of electric current to the motor 40 is interrupted by operation of a microswitch (not shown), which is controlled by the timing control cam 70, so that one cycle of operation of the Y-axis cutter 75 is completed.

Figure 10:
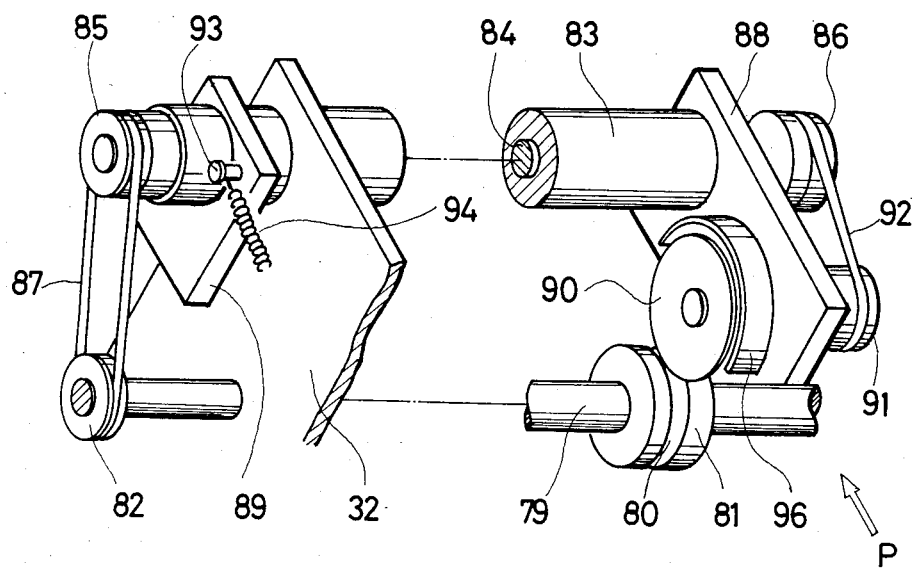
FIG. 10 is a perspective view showing the construction of an X-axis cutter in the paper cutting unit.
Figure 11:
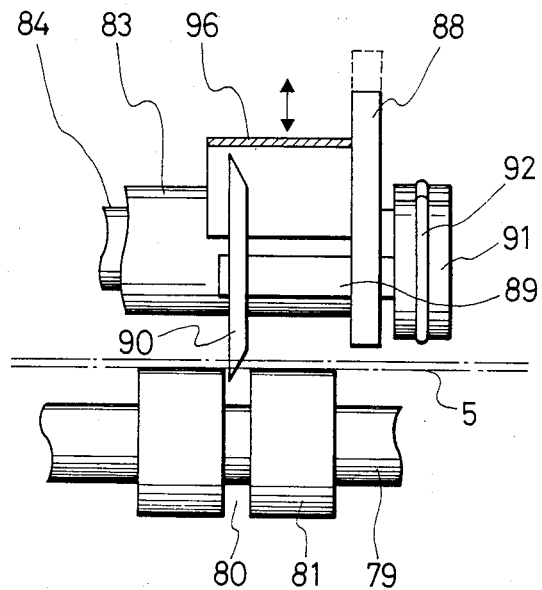
FIG. 11 is a sectional view of a part of the X-axis cutter of FIG. 10, which is viewed in the direction of an arrow P.

The motors 36, 37 are used as the driving power sources for an X-axis lengthwise cutter 78 shown in detail in FIGS. 10 and 11 and operable to carry out the cutting of the paper 5 continuously in the X-axis lengthwise direction which is parallel to the direction in which the paper 5 is fed. An instruction signal for driving these motors 36, 37 is obtained from the paper cutting control means 12.

The construction of the X-axis lengthwise cutter 78 will now be described. A rotary shaft 79 supported rotatably via a bearing 32 on the first and second side plates 31, 32 is gear-connected to an output shaft 37A of the motor 37. A drag roller 81 having a circumferential groove 80 is mounted fixedly on the portion of the rotary shaft 79 which is substantially halfway between the first and second side plates 31, 32, and a pulley 82 on the portion of the shaft 79 which is between the second and third side plates 32, 33. In a position adjacent to the rotary shaft 79, a tubular pipe 83 supported rotatably via a bearing on the second side plate 32 is provided so as to extend in substantially parallel with the shaft 79. The tubular pipe 83 is provided with a shaft 84 extending rotatably therethrough, and pulleys 85, 86 are mounted fixedly on both end portions, which project from both ends of the tubular pipe 83, of the rotary shaft 84. A belt 87 is provided between the pulley 85 mounted fixedly on the rotary shaft 84 and the pulley 82 mounted fixedly on the rotary shaft 79, so that the rotational movement of the rotary shaft 79, which is turned by an output from the motor 37, is transmitted to the rotary shaft 84 via the belt 87.

One end portion of the tubular pipe 83, which is extended to the space between the first and second side plates 31, 32, is positioned substantially halfway between these plates 31, 32, and the other end portion thereof, which is extended to the space between the second and third side plates 32, 33, is positioned near the second side plate 32. A cutter arm 88 is mounted fixedly on the first-mentioned end portion of the tubular pipe 83, and a cam lever 89 on the second-mentioned end portion thereof, in such a manner that the cutter rm 88 and cam lever 89 are rotated unitarily with the tubular pipe 83. The cutter arm is provided thereon with a rotary shaft 89 supported rotatably thereon, a disc type slitter knife 90 and a pulley 91, which are mounted fixedly on the end portions of the rotary shaft 89, and a protective cover 96 for protecting a part of the outer circumferential surface of the slitter knife 90. A belt 92 is provided between the pulleys 91, 86, and the rotation of the rotary shaft 84 is transmitted to the rotary shaft 89 via the pulley 86, belt 92 and pulley 91 so as to turn the slitter knife 90. The slitter knife 90 is located in a position opposed to the circumferential groove 80 in the drag roller 81.

When the slitter knife 90 is displaced downward in accordance with the clockwise pivotal movement of the tubular pipe 83, it can enter the groove 80 as it turns, to cut continuously the paper 5 fed to the position between the slitter knife 90 and drag roller 81. The cam lever 89 mounted on the end portion of the tubular pipe 83 which is between the second and third side plates 32, 33 is engaged with a cam surface of a control cam 100, which is gear-connected to the output shaft 36A of the motor 36 and adapted to be rotatable, by the resilient force of a spring 94, one end of which is implanted in the cam lever 89, and the other end of which is engaged with the second side plate 32. This control cam 100 normally holds the cam lever 89 in a position in which the slitter knife 90 is displaced upward.

When the motor 36 is rotated, the cam lever 89 is turned counter-clockwise with the tubular pipe 83 to cause a paper-cutting operation of the slitter knife to be started. When the cutting of the paper 5 is finished, the cam lever 89 is turned clockwise with the tubular pipe 83 to displace the slitter knife 90 upward and thereby complete the paper-cutting step. Simultaneously with the completion of the paper-cutting step, the microswitch (not shown) is operated by a control cam to stop the rotation of the motors 36, 37.

The motor 38 is used as a driving power source to control the pivotal movement of the shutter plate 95 (FIG. 5), which is adapted to select a transfer passage for the paper which has passed the Y-axis cutter 75. A signal for instructing the driving of the motor 38 is obtained from the paper cutting control unit 12. The shutter plate 95 is provided with hinges (not shown) fixed with screws to front end portions of both side surfaces thereof, and the shafts of the hinges are supported via bearngs on the first and second side plates 31, 32 so taht the shafts can be turned. The shutter plate 95 is connected to receive the rotary power of the motor 38 via a link mechanism (not shown), and to be turned up and down around the fulcrum hinges. When the portion of the paper 5 which is on the rear side of the portion thereof cut off by the Y-axis cutter constitutes a figure-writing region, the shutter plate 95 is in a position shown by a full line in FIG. 5, and operated to transfer the paper to the subsequent feed rollers 58, 59. When the portion of the paper 5 which is on the rear side of the cut portion thereof constitutes a non-figure-writing region and is discarded as chips, the shutter plate 95 is in a position shown by a broken line in FIG. 5, and is operated to drop the chips of the paper 5 onto the conveyor belt 65. In both of these cases, the operation of the shutter plate 95 is carried out by driving the motor 38 by the paper cutting control unit 12 via the motor driver 18. The time for stopping the shutter plate 95 at its upper and lower dead points is detected by the operation of a microswitch (not shown), which is actuated by a cam (not shown) attached to the shaft 38A of the motor 38. Therefore; especially, when the present invention is used with an electrostatic plotter in which soiled portions occur before and behind a figure-writing region, the soiled portions can be discharged as chips via the conveyor belt 65 by operation of the shutter plate 95 which works very effectively.

As described above, in the paper cutting system for automatic drawing machines according to the present invention, drawings are made on the roll type drawing paper by the automatic drawing machine under the control of the central control unit, and discriminating signals, such as bar codes are also written thereon at the same time. The roll drawing paper on which the drawing and discriminating signals are set down is fed to a paper cutting unit. The paper cutting unit adapted to receive such drawing paper is provided with a cutter means, which consists of a Y-axis cutter having rotary and fixed blades disposed in opposition to each other on both sides of the drawing paper and adapted to cut the drawing paper continuously in the Y-axis direction which is at substantially right angles to the direction in which the drawing paper is fed by bringing an edge of the fixed blade into contact with that of the rotary blade, and a rotary disc X-axis cutter having a circumferentially grooved rotary body disposed on one side of the drawing paper, and a slitter knife disposed in opposition to the rotary body and on the other side of the drawing paper and adapted to be moved selectively at substantially right angles to the drawing paper into and out of the circumferential groove in the rotary body and thereby cut the drawing paper in the X-axis direction parallel to the drawing paper-feeding direction. A control means is composed of a detector, formed of bar code readers for reading the discriminating signals written on the drawing paper, a bar code driver, a paper cutting control unit for controlling the cutter means in accordance with signals from the detector, and a motor driver. The discriminating signals designated by the automatic drawing machine are detected by the detector in the paper cutting unit, and the Y-axis cutter and X-axis cutter in the cutter means are controlled by the control means.

Accordingly, a paper-cutting operation may not be carried out simultaneously with a figure-drawing operation by the automatic drawing machine; and the drawing paper of a desired size can be output independently of and even after the figure-drawing operation by the automatic drawing machine. Therefore, the paper cutting system according to the present invention is suitable for producing a large quantity of drawings. Moreover, even when different types of automatic drawing machines and central control units are used, this sytem can be operated excellently provided that predetermined discriminating signals are written on the drawing paper. thus the paper cutting system has wide application.

What is claimed is:

1. A paper cutting system for automatic drawing machines, comprising: an automatic drawing machine having means for making a drawing of any one of a predetermined number of desired sizes on a drawing paper and for writing discriminating signals relating to the desired lengthwise and widthwise size of the drawing on a section of the drawing paper in accordance with signals from a central control unit and having means for transferring the paper lengthwise; and a paper cutting unit having cutter means composed of a Y-axis cutter having rotary and fixed blades disposed in opposition to each other on opposite sides of said drawing paper and operative to cut said drawing paper continuously in the Y-axis direction which is at substantially right angles to the lengthwise direction in which said drawing paper is transferred by bringing an edge of said fixed blade into contact with that of said rotary blade, and a rotary disc type X-axis cutter having a circumferentiallygrooved rotary body disposed on one side of said drawing paper, and a slitter knife disposed in opposition to said rotary body and on the other side of said drawing paper and selectively movable at substantially right angles to said drawing paper into and out of said circumferential groove in said rotary body to thereby cut said drawing paper in the X-axis direction parallel to the drawing paper-feeding direction, detecting means for reading the discriminating signals written on said drawing paper and producing corresponding output signals, and control means for controlling said cutter means in accordance with the output signals from said detecting means to obtain a cut piece of drawing paper containing thereon the drawing of of the desired size as determined by the discriminating signals.

2. A drawing system for making drawings of different sizes on a longitudinally advanced roll of drawing paper and for automatically cutting the drawing paper to preselected sizes, the drawing system comprising: drawing means for making a draing of any one of a predetermined number of desired sizes on a section of a roll of drawing paper and for encoding the section of drawing paper with coded data relating to the desired lengthwise and widthwise size of the drawing; decoding means for reading and decoding the coded data and for producing control signals relating to the desired lengthwise and widthwise size of the drawing; and cutting means for cutting the drawing paper in the lengthwise and widthwise directions in accordance with the control signals to obtain a cut piece of drawing paper containing thereon the drawing of the desired size as determined by the coded data.

3. A drawing system according to claim 2; wherein the cutting means comprises lengthwise cutter means for cutting the drawing paper along the lengthwise direction thereof, and widthwise cutter means for cutting the drawing paper along the widthwise direction thereof.

4. A drawing system according to claim 3; wherein the lengthwise cutter means is disposed downstream from the widthwise cutter means with respect to the direction of advancement of the drawing paper.

5. A drawing system according to claim 3; wherein the widthwise cutter means comprises a pair of cutting blades disposed on opposite sides of the longitudinally advanced drawing paper and extending laterally across the direction of advancement thereof, one of the pair of cutting blades comprising a rotary cutting blade which coacts with the other of the pair of cutting blades to cut the drawing paper in the widthwise direction in response to rotation of the rotary cutting blade, and means for rotationally driving the rotary cutting blade in accordance with a control signal produced by the decoding means.

6. A drawing system according to claim 5; wherein the lengthwise cutter means comprises a rotary slitter blade disposed on one side of the longitudinally advanced drawing paper and a grooved roller disposed on the other side thereof, means mounting the rotary slitter blade for movement toward the grooved roller to a cutting position in which the rotary slitter blade coacts with the grooved roller to cut the drawing paper in the lengthwise direction and for movement away from the grooved roller to a non-cutting position, and means for moving the rotary slitter blade to the cutting position in accordance with a control signal produced by the decoding means.

7. A drawing system according to claim 3; wherein the lengthwise cutter means comprises a rotary slitter blade disposed on one side of the longitudinally advanced drawing paper and a grooved roller disposed on the other side thereof, means mounting the rotary slitter blade for movement toward the grooved roller to a cutting position in which the rotary slitter blade coacts with the grooved roller to cut the drawing paper in the lengthwise direction and for movement away from the grooved roller to a non-cutting position, and means for moving the rotary slitter blade to the cutting position in accordance with a control signal produced by the decoding means.

8. A drawing system according to claim 2; wherein the drawing means comprises an automatic drawing machine having means for receiving input data representative of a desired drawing to be made on the drawing paper and of a desired size of the drawing, and means for making the desired drawing of the desired size on a section of the drawing paper in accordance with the input data.

9. A drawing system according to claim 8; wherein the automatic drawing machine includes means for encoding the drawing paper section with coded data relating to the desired size of the desired drawing in accordance with the input data.

10. A drawing system according to claim 9; wherein the coded data comprises a bar code pattern.

11. A drawing system according to claim 10; wherein the decoding means comprises a bar code reader for reading and decoding the bar code pattern and for producing control signals representative of the desired size of the desired drawing.

12. A drawing system according to claim 2; wherein the coded data comprises a bar code pattern.

13. A drawing system according to claim 12; wherein the decoding means comprises a bar code reader for reading and decoding the bar code pattern and for producing control signals representative of the desired size of the desired drawing.

* * * * *